Nov. 12, 1963   N. BREWER   3,110,420
CONTROL MEANS FOR SOLID DISPENSING APPARATUS
Filed Aug. 30, 1961   2 Sheets-Sheet 1

INVENTOR.
NATHANIEL BREWER
BY
Busser, Smith & Harding
ATTORNEYS

*INVENTOR.*
NATHANIEL BREWER
BY
Busser, Smith & Harding
ATTORNEYS

United States Patent Office 3,110,420
Patented Nov. 12, 1963

1

3,110,420
CONTROL MEANS FOR SOLID DISPENSING APPARATUS
Nathaniel Brewer, Newtown, Pa., assignor to Wilson Products, Inc., Neshanic, N.J., a corporation of New Jersey
Filed Aug. 30, 1961, Ser. No. 134,973
8 Claims. (Cl. 222—56)

This invention relates to means for controlling the delivery of free flowing solid materials, such as granules, powders and the like. More particularly, the control serves to maintain a desired level of material in a receiving hopper. This hopper may serve as a supply hopper from which the material is delivered to the ultimate means for using the same.

It is an object of this invention to provide a control of the indicated type which operates with a minimum number of starting and stopping cycles. In prior devices of this type any time the level of the material falls slightly below a predetermined level, the dispensing apparatus is started to cause the delivery of material to the hopper. By this arrangement of the prior devices, frequent and unnecessary starting and stopping cycles may occur.

Another object of this invention is to provide a control which can maintain the material in the hopper at a plurality of levels by means of a simple adjustment of the location of the control.

Briefly stated, the above objects are accomplished by the provision of an electrical circuit means controlling the operation of the apparatus for dispensing the free flowing solid material into a receiving hopper. A switch means is connected in said circuit means for controlling energization thereof. There is provided means responsive to the level in the hopper for actuating the switch means between controlling positions to energize and deenergize the circuit means which in turn controls the operation of the dispensing means. The switch actuating means is constructed and arranged to be responsive to an upper level of the material in the hopper for causing stoppage of the dispensing means operation and to be responsive to a lower level for causing initiation of dispensing means operation. Means are provided for positioning the actuating means at a plurality of levels within the hopper.

The above and other objects and advantages of the invention will appear more fully from the following description read in conjunction with the accompanying drawings in which.

Figure 1:
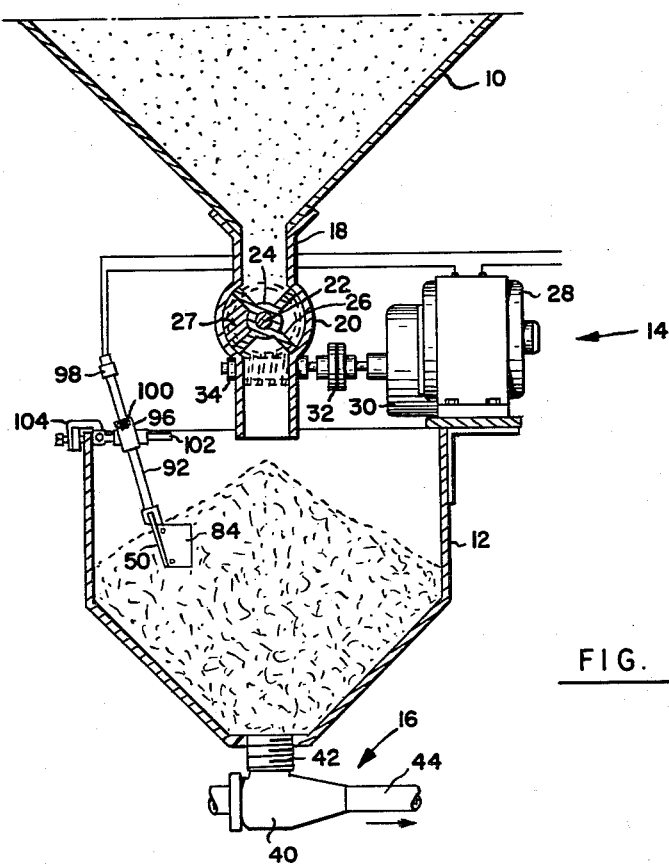
FIGURE 1 is an elevational sectional view of the apparatus embodying the control means in accordance with this invention.
Figure 2:
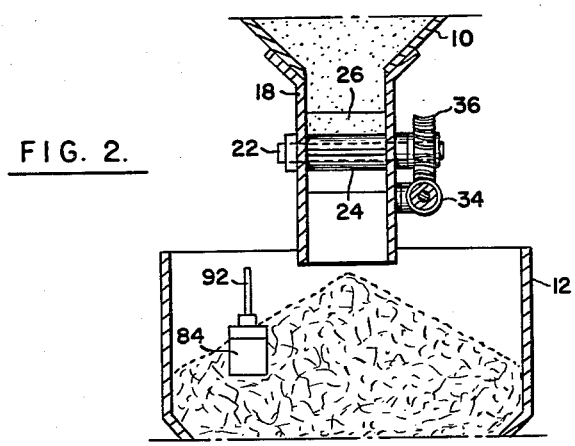
FIGURE 2 is a fragmentary sectional view of the apparatus shown in FIGURE 1 viewed from the right side thereof.

One use for the apparatus in accordance with this invention is for controlling the level of a mixture of color concentrates and uncolored resins in an extruder supply hopper. In this case, the level control serves to control the operation of a color blender which delivers the solids to the extruder supply hopper. This type of apparatus is disclosed in the co-pending application of Nathaniel Brewer and Melville M. Wilson, Serial No. 840,945 filed September 18, 1959, now United States Patent No. 3,005,575. However, the invention is more broadly usable to maintain the level of free flowing solid material in a hopper by controlling the operation of many types of apparatus for delivering the material to the hopper. Hence, the invention will be described more broadly as usable with any form of dispensing apparatus or means for delivering the material from the hopper.

The illustrated form of the invention comprises a supply hopper 10 containing the free flowing solid material, a receiving hopper 12, and a suitable means for dispensing the material from the supply hopper 10 into the receiving hopper 12, which means is indicated generally at 14. Suitable means are also provided for discharging the material from the receiving hopper 14, this means being generally indicated at 16.

The discharge opening at the bottom of supply hopper 10 communicates with a vertically extending discharge conduit 18 which is secured to the bottom of hopper 10. Conduit 18 has an enlarged portion defining a transfer compartment 20 which is in communication with the material in supply hopper 10 through the upper portion of conduit 18. A feed shaft 22 is mounted to extend horizontally through compartment 20, and has a feeder member 24 fixedly mounted thereon. The feeder 24 extends the full width of the compartment 20 and has radially extending vanes 26 which divide the compartment 20 into a plurality of transfer chambers. As the transfer member rotates in conjunction with shaft 26 the material in hopper 10 will successively fill the transfer chambers, and as the transfer chamber is moved to the bottom of the conduit 18 the material contained therein will fall through the bottom portion of conduit 18 into the receiving hopper 12. A proportioning block 27 may be positioned between adjacent vanes 26 if it is desired to feed less material per revolution.

Means are provided for driving the feed shaft 26 to cause the transfer of material from hopper 10 to hopper 12. This driving means comprises a motor 28 which drives a speed reducing mechanism 30 which is coupled at 32 to a worm gear 34. Worm gear 34 drives a worm wheel 36 which is fixedly mounted on shaft 22 to rotate conjointly therewith.

It will be evident that any suitable form of dispensing apparatus may be used for effecting transfer of the material from supply hopper 10 to receiving hopper 12. For example, a discharge gate may be provided to control the flow through transfer conduit 18, this gate being operated by solenoid means between open and closed positions in response to the supply of electrical energy thereto. Also, the blending apparatus disclosed in said prior-mentioned application may serve as the means for delivering material to hopper 12.

The illustrated discharge means 16 comprises an ejector 40 which is connected to the hopper 12 through an outlet connection 42. The ejector 40 is connected in a discharge line 44. It will be apparent that any suitable form of discharge apparatus may be provided consistent with the apparatus which is to receive the material from hopper 12. For example, this discharge apparatus may comprise a manually operated gate or other means for providing either continuous or intermittent discharge from the hopper 12.

Means are provided for maintaining a desired level of material in the hopper 12 regardless of whether the discharge from conduit 18 is intermittent or continuous. This means comprises a control assembly which senses the level of the material in hopper 12 and controls the delivery from hopper 10 by controlling the operation of the motor 28.

Figure 3:
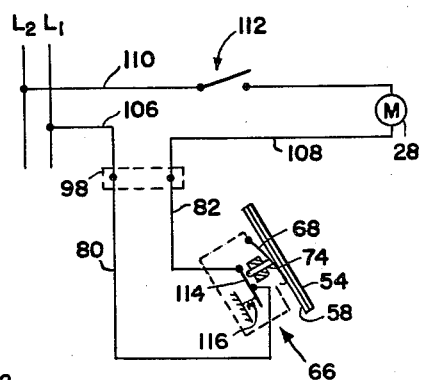
FIGURE 3 is a diagrammatic view of the circuitry of the apparatus in accordance with this invention.

The control assembly is shown in detail in FIGURE 3 and comprises a housing 50 having a rectangular cavity 52 therein. A diaphragm 54 is mounted on housing 50 by retaining rods 56 mounted in a groove surrounding cavity 52 so that diaphragm 54 serves to enclose the cavity 52 to prevent the entrance of the material which is contained in hopper 12. Diaphragm 54 is constructed of a suitable flexible material, such as Mylar, and has a thickness of the order of 0.002 inch. A pressure plate 58 is attached to the inner side of diaphragm 54 by means of rivets 60 which also secure one end of a spring member 62 to the pressure plate 58, the spring member 62 being secured at its other end to a portion of the housing 50 by means of a screw 64. The pressure plate 58 serves to maintain the diaphragm 54 in a substantially flat condition. The spring means 62 serves to bias the diaphragm and pressure plate outwardly of cavity 52.

Mounted within chamber 52 is a normally closed microswitch 66 which is of any suitable type well known in the art. A spring actuating arm 68 is mounted at one end on the exterior of switch 66 and contacts the inner side of pressure plate 58 at its other end to bias the same outwardly of the cavity 52. Arm 68 is adapted to flex about the support 70 at one end thereof. Outward movement of arm 68 is limited by a stop member 72. A switch actuating plunger 74 is mounted to extend exteriorly of the switch casing for contact with the underside of switch actuating arm 68. Inward movement of plunger 74 will cause opening of the switch 66 as will be more fully described hereafter. Switch 66 is provided with a pair of terminals 76 and 78 which are connected to conductors 80 and 82, respectively. Conductors 80 and 82 are part of the control circuit for the motor 28 and are connected to opposite sides of switch 66.

Figure 4:
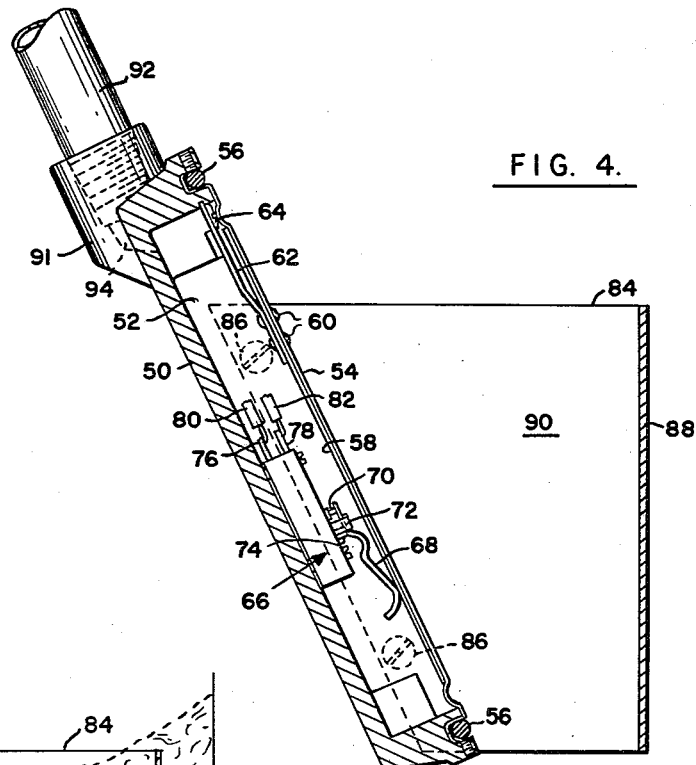
FIGURE 4 is a sectional view of a detail of the control means.

Mounted on housing 50 is a U-shaped member 84 which is secured to the side walls of the cavity 52 as by screws 86. As is best shown in FIGURE 4, the base 88 of member 84 extends at an angle with the diaphragm 54. Member 84 cooperates with diaphragm 54 to define a hopper 90 which has open top and bottom ends.

Means are provided for positioning the housing 50 and the parts mounted thereon within the hopper 12. To this end, a fitting 91 is provided at the upper end of housing 50 as viewed in FIGURE 3, which fitting is internally threaded for the reception of a tubular member 92. A passageway 94 is provided in fitting 91 to provide communication between chamber 52 and the interior of the conduit 92. As shown in FIGURE 1, the tubular member 92 is adapted to be adjustably positioned in a support member 96 and terminates, at its upper end, in an electrical connector 98. Conductors 80 and 82 may thus pass from terminals 76 and 78 through passageway 94 and through the interior of tubular member 92 for connection with the connector 98. Suitable clamping means 100 are provided for permitting sliding adjustment of member 92 in support member 96 for varying the vertical position of the housing 50. Support member 96 is also slidably mounted on a horizontally extending rod 102. Rod 102 is secured to a clamping means 104 which is adapted to be clamped to the upper portion of hopper 12. Thus, by horizontally positioning the support member 96 on rod 102 and by vertically positioning tubular member 92 within support member 96 the housing 50 may be positioned at a plurality of locations within hopper 12.

Referring now to FIGURE 4, the conductor 80 is connected to one supply line $L_1$ of a source of electrical energy by a conductor 106 and conductor 82 is connected to one side of the motor 28 through a conductor 108. The other side of the motor is connected to the other supply line $L_2$ through a conductor 110. A manually operable control switch 112 is serially connected in conductor 110. Thus, the control circuit for the motor 28 is as follows: from supply line $L_1$, through conductor 106, conductor 80, switch arm 114, conductor 82, conductor 108, motor 28, switch 112, and conductor 110 to the other supply line $L_2$.

As is shown schematically in FIGURE 4, the switch arm 114 of the microswitch 66 is biased toward contact with the fixed terminal thereof by a spring means 116.

The switch plunger 74 is shown with one end contacting switch arm 114 and the other end contacting switch actuating member 68. Member 68 is shown in contact with pressure plate 58 which is actuated by the movement of diaphragm 54. It will thus be apparent that inward movement of diaphragm 54 will cause a corresponding movement of pressure plate 58 and plunger 74 to cause opening of the normally closed switch 66.

Figure 7:
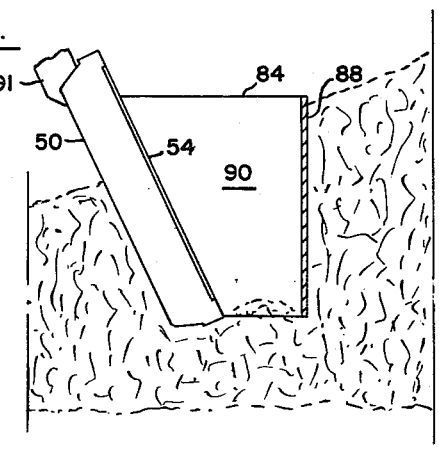

In positioning the control assembly within the hopper 12, the base 88 of member 84 should be positioned to extend approximately vertically so that the diaphragm 54 extends at an angle to the vertical. Also, the housing 50 should be positioned in spaced relation to the center line of the delivery conduit 18 so that the material falling from the lower end of conduit 18 into hopper 12 will not fall into the hopper 90. The hopper 90 should be positioned at the desired level within the hopper 12 for the operating condition involved. The parts of the control assembly are constructed and arranged in the operating position such that the force which is applied to the switch actuating plunger 74 with the hopper 90 empty (FIGURE 7) will not cause inward movement thereof sufficient to open the switch 66 against the bias of switch return spring 116 and such that the force applied to the switch actuating plunger with the hopper substatnially filled (FIGURE 5) will be sufficient to overcome the bias of spring 116 and open the switch 66.

Figure 5:
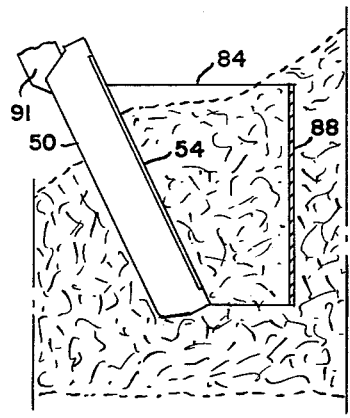
FIGURES 5, 6 and 7 are views illustrating sequential operating conditions of the apparatus.

In the operation of the apparatus, with the switch 112 closed and the discharge means 16 continuously operable to withdraw material from hopper 12, the control assembly will be operative to maintain the level of the material in hopper 12 at a predetermined height in accordance with the position of the hopper 90. Assuming that the material in hopper 12 is at its upper level as shown in FIGURE 5, the hopper 90 will contain solid material. The weight of this solid material on diaphragm 54 will position the same in an inward position in accordance with which actuating arm 68 is moved inwardly about its pivot 70 to position the plunger 74 in a position to move switch arm 114 out of contact with the fixed contact of switch 66. This breaks the control circuit to the motor 28 whereby this motor 28 is in an inoperative condition.

Figure 6:
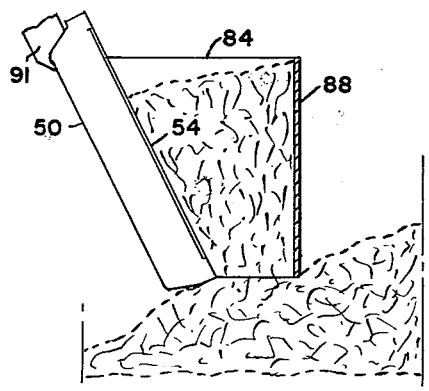

As the discharge apparatus 16 continuously operates to withdraw material from the bottom of hopper 12, the level of the material in hopper 12 recedes. As this level recedes, the hopper 90 will initially retain the material which has previously entered the same. This hopper will remain in this condition until the level of the material reaches the lower edge of the hopper 90, this condition being illustrated in FIGURE 6. When the level falls below this height, the lower opening of the hopper 90 is uncovered so that the material therein will fall out through the bottom opening. When the hopper 90 is emptied, the diaphragm 54 will return to its outer position by the action of springs 68 and 62. In this outer position of diaphragm 54 the switch arm 114 is moved to the closed position by the spring 116 to thereby close the switch 66 and also close the control circuit for the motor 28.

With the motor 28 energized, it is operative to drive the transfer member 24 by means of reduction gearing 30, couple 32, worm gear 34, worm wheel 36 and shaft 22. As the transfer member 24 rotates the dispensing means 14 delivers material from supply hopper 10 into receiving hopper 12 through the conduit 18.

As the level of the material in chamber 12 is raised, initially none of the material will enter the hopper 90 since, because of its solid state, the material cannot flow upwardly into the hopper 90. Moreover, since the level is not high enough, no material can flow into hopper 90 through its top opening. This condition will be maintained until the level reaches that illustrated in FIGURE 7. However, when the level of the material reaches the upper end of hopper 84 material will overflow into hopper 90 to thereby fill the same, whereby the control assembly is again in the condition illustrated in FIGURE 5. In this condition, the diaphragm 54 will be moved to the above-described control position in which the switch 66 is actuated to its open position to thereby break the control circuit for motor 28 and de-energize the same.

The apparatus will continue to operate in the above-described cycle to maintain the level of material in hopper 12 in accordance with the position of the control assembly. If it is desired to change the level to be maintained in hopper 12, the control assembly may be positioned to a different level by simple adjustment of the supporting means for the housing 50.

The construction in accordance with this invention prevents frequent and unnecessary start-stop cycles by maintaining a maximum and minimum level within a range which approximates the vertical height of the base 88. Thus, during the period in which the level of the material in hopper 12 falls from the maximum level (FIGURE 5), which is that level at the upper end of hopper 90, the material within hopper 90 will maintain the motor 28 in an inoperative condition. This condition will be maintained until the level of the material in hopper 90 falls below the level illustrated in FIGURE 6 thereby permitting discharge of the material in hopper 90. When the motor is actuated to the energized condition with the material at its lower level, the motor will remain in this condition until the level of the material is increased from a point below the lower edge of base 88 to a level above the upper edge of base 88. This time delay permits the feeder to run a substantial length of time instead of just for a short period. Thus, by reason of the hopper arrangement, unnecessary starting and stopping is eliminated.

It will be evident that various changes may be made in the construction of the apparatus without departing from the scope of the invention wherefore it is not desired to be limited except as required by the following claims.

What is claimed is:

1. In combination, means for dispensing free flowing solid material, a hopper for receiving the dispensed material, and means for controlling the level of solid material in said hopper comprising electrical circuit means for controlling operation of said dispensing means having a switch means operable between a pair of positions for controlling energization of said electric circuit means and means responsive to the level of material in said hopper for actuating said switch means between said pair of positions thereof, said level responsive means including a diaphragm means biased to a first control position and movable in response to the weight of solid material thereon from said first control position to a second control position, means responsive to said movement of said diaphragm means for actuating said switch means between said positions thereof and means communicating with the material within said receiving hopper for controlling the flow of material into contact with said diaphragm, said flow controlling means restricting flow into contact with said diaphragm until the material reaches an upper level in said receiving hopper and maintaining the material in contact with said diaphragm until the material in the receiving hopper drops to a predetermined lower level from said upper level.

2. In combination, means for dispensing free flowing solid material, a hopper for receiving the dispensed material, and means for controlling the level of solid material in said hopper comprising electrical circuit means for controlling operation of said dispensing means having a switch means operable between a pair of positions for controlling energization of said electric circuit means and means responsive to the level of material in said hopper for actuating said switch means between said pair of positions thereof, said level responsive means including a diaphragm means biased to a first position movable in response to the weight of solid material thereon from said first control position to a second control position, means responsive to said movement of said diaphragm means for actuating said switch means between said positions thereof and means cooperating with said diaphragm means for defining a hopper means having open top and bottom ends in communication with said receiving hopper, said diaphragm being positioned to be responsive to the weight of material contained in said hopper means.

3. In combination, means for dispensing free flowing solid material, a hopper for receiving the dispensed solid material, and means for controlling the level of material in said hopper comprising electrical circuit means for controlling operation of said dispensing means having a switch means operable between a pair of positions for controlling energization of said circuit means and means responsive to a first level of material in said hopper for actuating said switch means to one of said positions and to a second level of material in said hopper lower than said first level for actuating said switch means to the other of said positions, said level responsive means including a diaphragm means biased to a first control position and movable in response to the weight of solid material thereon from said first control position to a second control position, means responsive to said movement of said diaphragm means for actuating said switch means between said positions thereof and means communicating with the material within said receiving hopper for controlling the flow of material into contact with said diaphragm, said flow controlling means restricting flow into contact with said diaphragm until the material reaches an upper level in said receiving hopper and maintaining the material in contact with said diaphragm until the material in the receiving hopper drops to a predetermined lower level from said upper level.

4. In combination, means for dispensing free flowing solid material, a hopper for receiving the dispensed solid material, and means for controlling the level of material in said hopper comprising electrical circuit means for controlling operation of said dispensing means having a switch means operable between a pair of positions for controlling energization of said circuit means and means responsive to a first level of material in said hopper for actuating said switch means to one of said positions and to a second level of material in said hopper lower than said first level for actuating said switch means to the other of said positions, said level responsive means including a diaphragm means biased to a first control position and movable in response to the weight of solid material thereon from said first control position to a second control position, means responsive to said movement of said diaphragm means for actuating said switch means between said positions thereof, and means cooperating with said diaphragm means for defining a hopper having open top and bottom ends communicating with said receiving hopper, said diaphragm being positioned to be responsive to the weight of material contained in said receiving hopper.

5. In combination, means for dispensing free flowing solid material, a hopper for receiving the dispensed solid material, means for controlling the level of material in said hopper comprising electrical circuit means for controlling operation of said dispensing means having a switch means operable between a pair of positions for controlling energization of said circuit means and means responsive to a first level of material in said hopper for actuating said switch means to one of said positions and to a second level of material in said hopper lower than said first level for actuating said switch means to the other of said positions, said level responsive means including a diaphragm means biased to a first control position and movable in response to the weight of solid material thereon from said first control position to a second control position, means responsive to said movement of said diaphragm means for actuating said switch means between said positions thereof, and means cooperating with said diaphragm means for defining a hopper having open top and bottom ends communicating with said receiving hopper, said diaphragm being positioned to be responsive to the weight of material contained in said receiving hopper, and means for adjustably mounting said level responsive means at a plurality of positions within said receiving hopper.

6. In combination, electrically operated means for dispensing free flowing solid granular material, a hopper for receiving the dispensed solid material, means for controlling the level of material in said hopper comprising electrical circuit means for providing electrical energy to said dispensing means having a switch means operable between a pair of positions for controlling energization of said circuit means and means responsive to a first level of material in said hopper for actuating said switch means to one of said positions and to a second level of material in said hopper lower than said first level for actuating said switch means to the other of said positions, and means for positioning said level responsive means at a plurality of locations within said receiving hopper.

7. A level control for a pile of free flowing solid material supported by a pile forming means comprising means defining an open ended hopper independent of said pile forming means, means for positioning said hopper defining means in a stationary position overlying a portion of the pile, said hopper defining means including a flexible wall portion biased to a first position when said hopper is empty and movable against said bias to a second position in response to the weight of material contained in said hopper, and control means operatively associated with said wall portion and movable between a pair of controlling positions in response to said wall portion movement between said first and second positions.

8. Apparatus as claimed in claim 7 wherein said control means comprises a switch means operatively connected to said wall portion and movable between open and closed positions in response to said movement of said wall portion between said first and second positions.

References Cited in the file of this patent
UNITED STATES PATENTS

| | | |
|---|---|---|
| 1,489,938 | Hale | Apr. 8, 1924 |
| 2,408,221 | Michel | Sept. 24, 1946 |
| 2,568,332 | Genovese | Sept. 18, 1951 |
| 2,638,248 | Alvord | May 12, 1953 |
| 2,674,396 | Peterson | Apr. 6, 1954 |